United States Patent
Rogers

(10) Patent No.: US 6,179,385 B1
(45) Date of Patent: *Jan. 30, 2001

(54) SIDE DUMP BODY

(75) Inventor: Ralph R. Rogers, South Sioux City, NE (US)

(73) Assignee: Thurston Mfg., Thurston, NE (US)

(*) Notice: Under 35 U.S.C. 154(b), the term of this patent shall be extended for 0 days.

This patent is subject to a terminal disclaimer.

(21) Appl. No.: 09/349,669

(22) Filed: Jul. 8, 1999

Related U.S. Application Data

(63) Continuation of application No. 09/226,571, filed on Jan. 7, 1999, now Pat. No. 5,967,615.

(51) Int. Cl.$^7$ .................................................. B60D 1/16
(52) U.S. Cl. ........................... 298/18; 298/8 R; 298/22 P
(58) Field of Search ............................ 298/8 R, 18, 22 P; 414/470

(56) References Cited

U.S. PATENT DOCUMENTS

| | | |
|---|---|---|
| 3,019,054 | 1/1962 | Stahly . |
| 3,323,838 | 6/1967 | Trucco et al. . |
| 3,753,593 | 8/1973 | Wells et al. . |
| 3,844,617 | 10/1974 | Kostman . |
| 4,200,334 | 4/1980 | Lindholm . |
| 5,480,214 | 1/1996 | Rogers . |
| 5,967,615 | * 10/1999 | Rogers .................................. 298/18 |

* cited by examiner

*Primary Examiner*—Stephen T. Gordon
(74) *Attorney, Agent, or Firm*—Zarley, Mckee, Thomte Voorhees & Sease; Dennis L. Thomte

(57) ABSTRACT

A side dump body including a plurality of side dump body units pivotally mounted on a truck or trailer frame. Each of the side dump body units may be individually pivotally moved from a transport position to a dumping position whereby the contents of the dump body units may be dumped from the side of the truck or trailer.

14 Claims, 5 Drawing Sheets

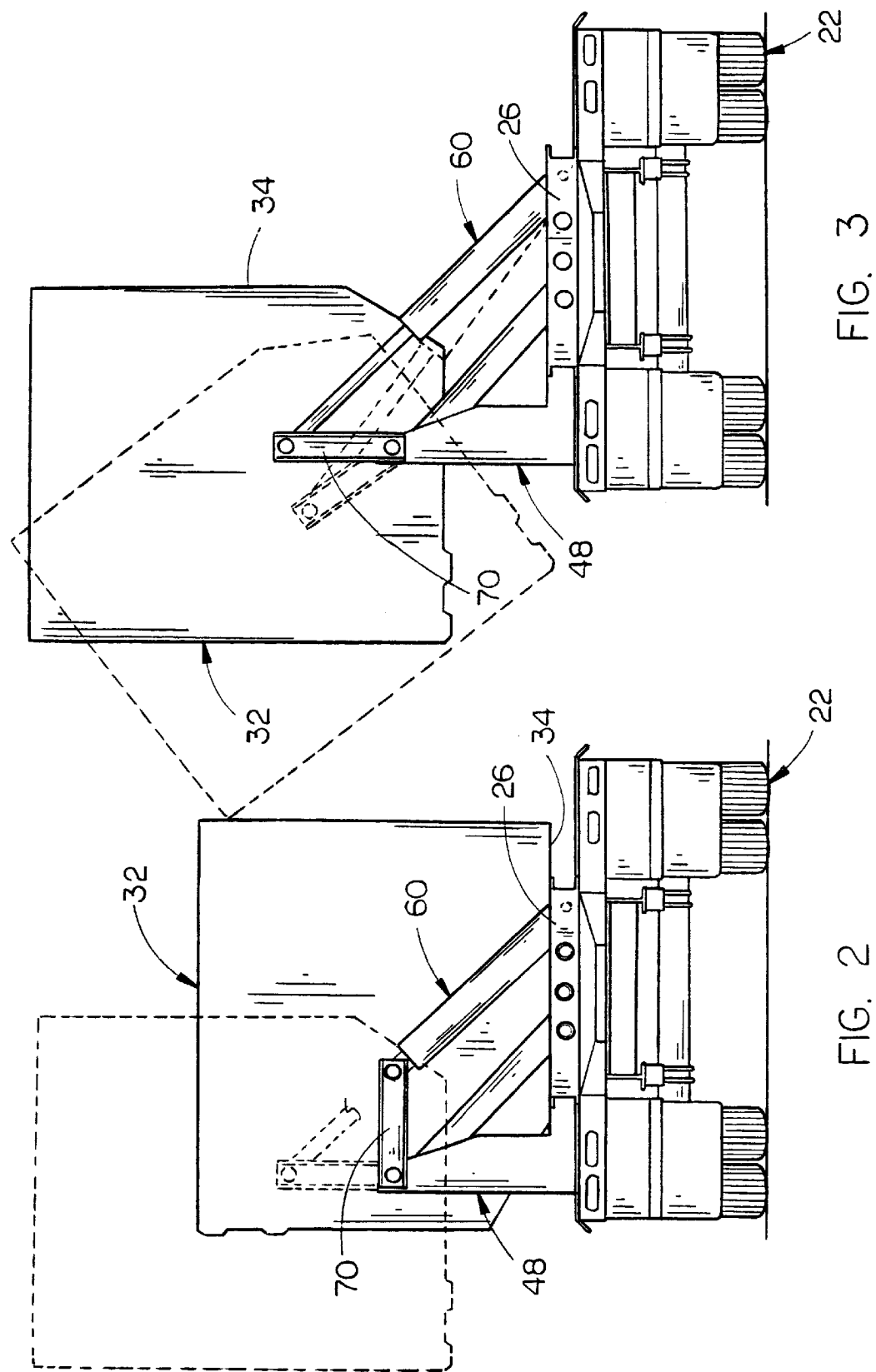

SIDE DUMP BODY

CROSS-REFERENCE TO RELATED APPLICATION

This is a continuation application of Petitioner's earlier application Ser. No. 09/226,571 filed Jan. 7,1999, issued as U.S. Pat. No. 5,967,615 and entitled A SIDE DUMP BODY.

BACKGROUND OF THE INVENTION

1. Field of the Invention

This invention relates to a side dump body and more particularly to a side dump body for use on a trailer or truck and which has increased carrying capacity when compared to conventional side dump trailers.

2. Dedcription of the Related Art

Dump bodies which are employed on trailers or trucks normally are of the end dump type or the side dump type. Since the introduction of the side dump body disclosed in applicant's U.S. Pat. No. 5,480,214, side dump trucks and trailers have experienced wide acceptance. Perhaps the only drawback to applicant's earlier side dump body is that the body does not have as much carrying capacity as an end dump body due to the fact that the side walls of the side dump body extend upwardly and outwardly from a bottom wall, rather than extending vertically upwardly from a bottom wall as in most conventional end dump bodies. The bottom dump or belly dump bodies also suffer the same drawback, since the side walls of those trailers normally extend upwardly and outwardly from a bottom wall rather than substantially vertically from a bottom wall.

A further disadvantage of conventional side dump and end dump trailers is that they are only able to haul a single commodity.

SUMMARY OF THE INVENTION

A side dump body is disclosed which has substantially vertically disposed side walls to increase the carrying capacity of the body as compared to those side dump bodies having upwardly and outwardly extending side walls. A plurality of first and second, horizontally spaced-apart supports are secured to the frame means of the truck or trailer. A side dump body is positioned between each pair of first and second supports. The upper ends of the first and second supports are pivotally secured to the front and back walls of each dump body. First and second hydraulic cylinders are associated with each of the first and second supports and are pivotally connected at their lower ends to the frame means of the trailer or truck and extend upwardly therefrom. The upper ends of the first and second hydraulic cylinders are pivotally secured to the front and back walls of the respective dump body laterally of the pivotal connection of the upper ends of the first and second supports with the front and back walls of the side dump body. The extension of the hydraulic cylinders causes the dump body to pivotally move with respect to the first and second supports so that the dump body is pivoted with respect to the frame means so that the contents thereof may be dumped laterally from the truck or trailer. When a plurality of the side dump bodies are employed on the frame means, each of the dump bodies may contain a different product such as rock, sand, mulch, etc.

It is therefore a principal object of the invention to provide an improved side dump body for use on a truck or trailer.

Still another object of the invention is to provide a side dump body having an increased carrying capacity when compared to conventional side dump bodies.

Yet another object of the invention is to provide a side dump body which is stable during use.

Still another object of the invention is to provide a side dump truck or trailer wherein a plurality of side dump bodies are individually selectively pivotally secured to the frame means of the truck or trailer.

Still another object of the invention is to provide a side dump body which normally rests on the longitudinally extending frame members of the truck or trailer when the body is in its transport or non-dumping position.

These and other objects of the invention will be apparent to those skilled in the art.

BRIEF DESCRIPTION OF THE DRAWINGS

FIG. 2 is a rear elevational view of the side dump body of this invention with the broken lines illustrating the dump body being pivotally moved;

FIG. 3 is a view similar to FIG. 2 except that the dump body has been pivoted to its dumping position;

DESCRIPTION OF THE PREFERRED EMBODIMENT

Figure 1:
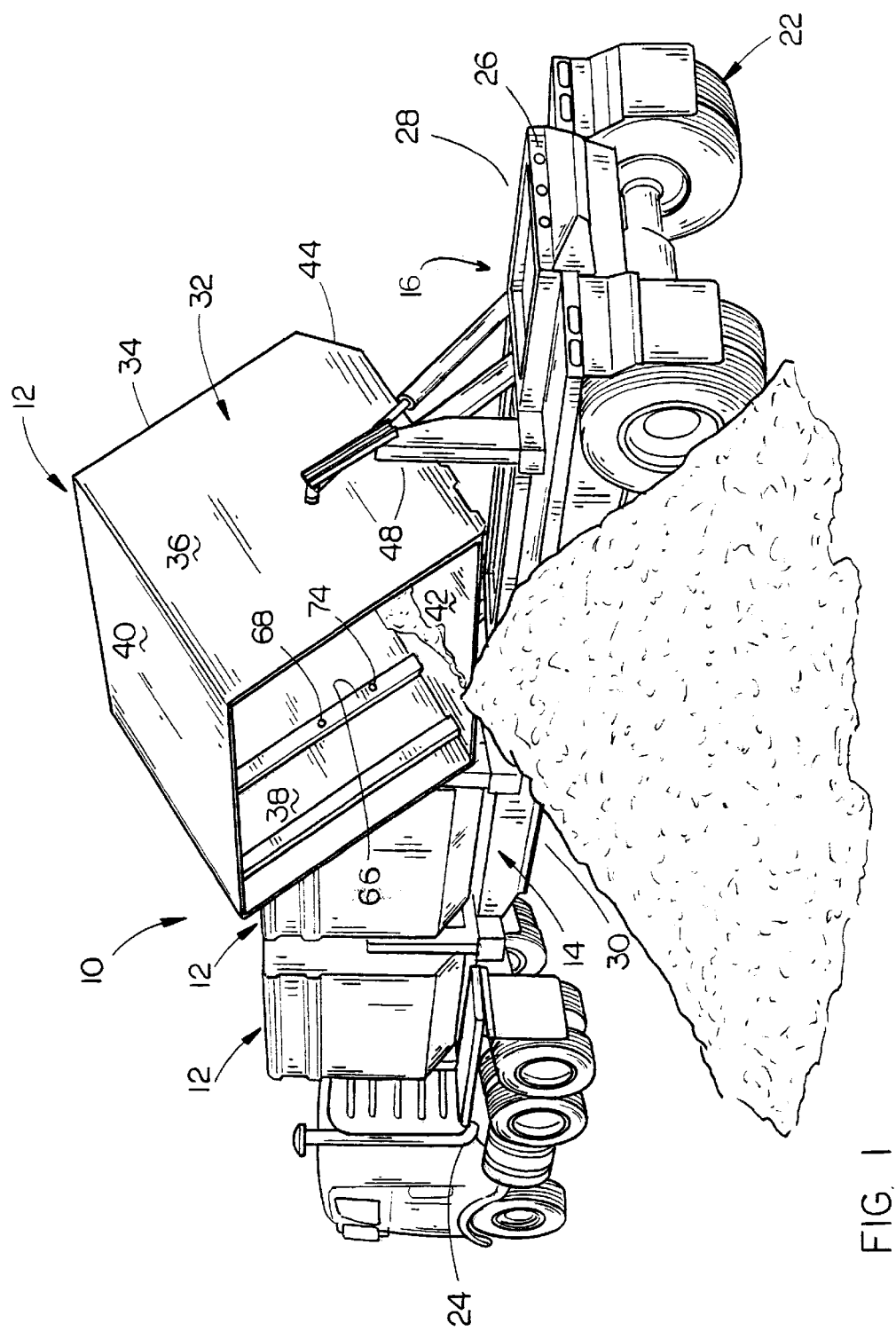
FIG. 1 is a rear perspective view of the side dump body of this invention with one of the dump bodies having been pivotally moved to a dumping position.

The side dump body of this invention is referred to generally by the reference numeral 10 and comprises one or more side dump units 12 mounted on a frame means 14 which may be incorporated into a trailer or into what is commonly called a straight truck. Although the drawings illustrate the side dump body 10 being mounted on a trailer 16, the side dump body could also be mounted on a truck as described.

Frame means 14 normally comprises a pair of longitudinally extending frame members 18 and 20 which are conventionally supported on a running gear 22. For purposes of description, the frame means 14 will be described as including a forward end 24, rearward end 26, and opposite sides 28 and 30.

Inasmuch as each of the side dump units 12 are identical, only a single side dump unit 12 will be described. Side dump unit 12 includes a body or tub 32 including a bottom wall 34, rear wall 36, front wall 38, and side walls 40 and 42. A short tapered wall portion 44 is provided between bottom wall 34 and side wall 42, as seen in the drawings, for a purpose to be described hereinafter.

Figure 4:
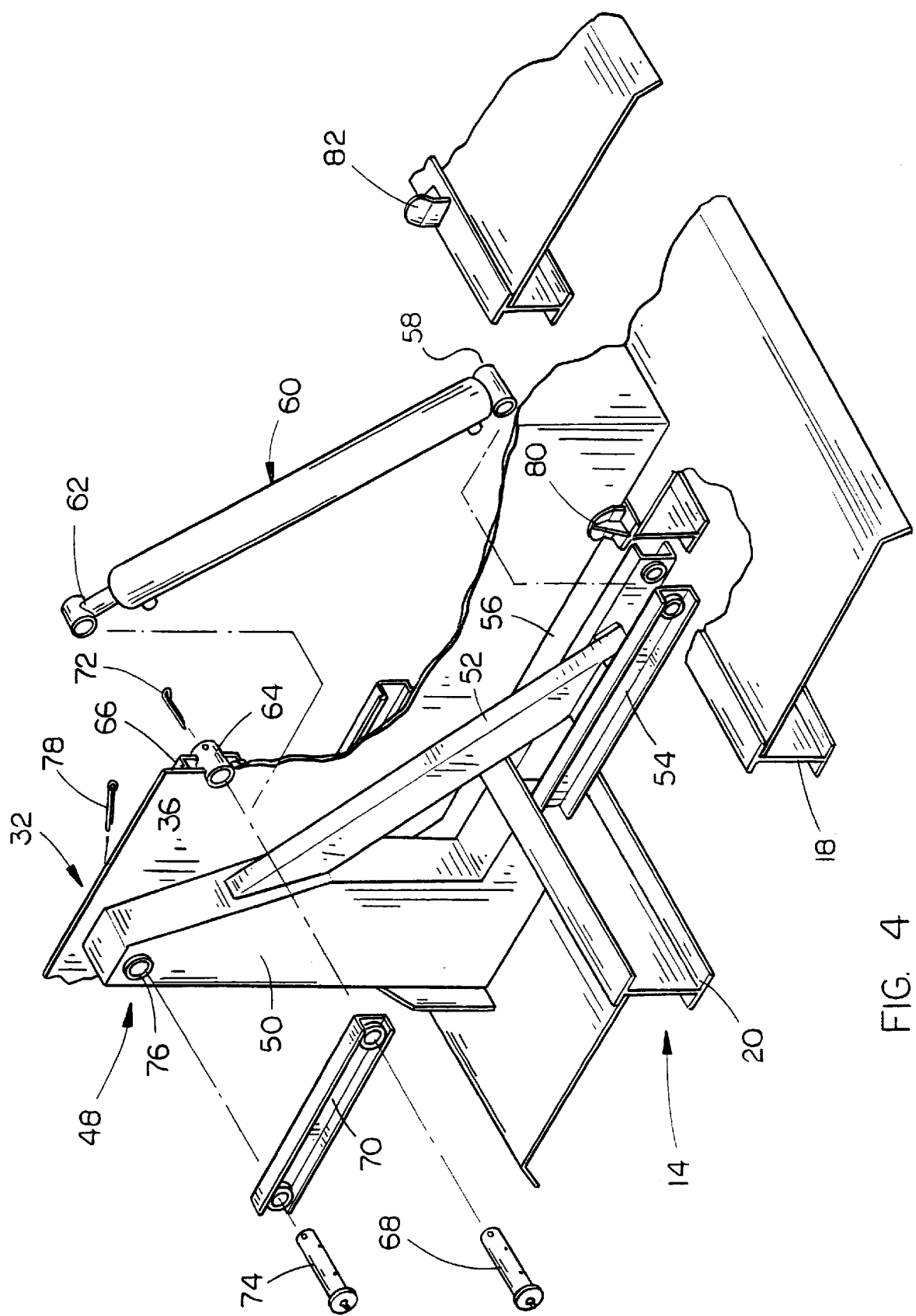
FIG. 4 is a partial exploded perspective view of one of the supports.
Figure 5:
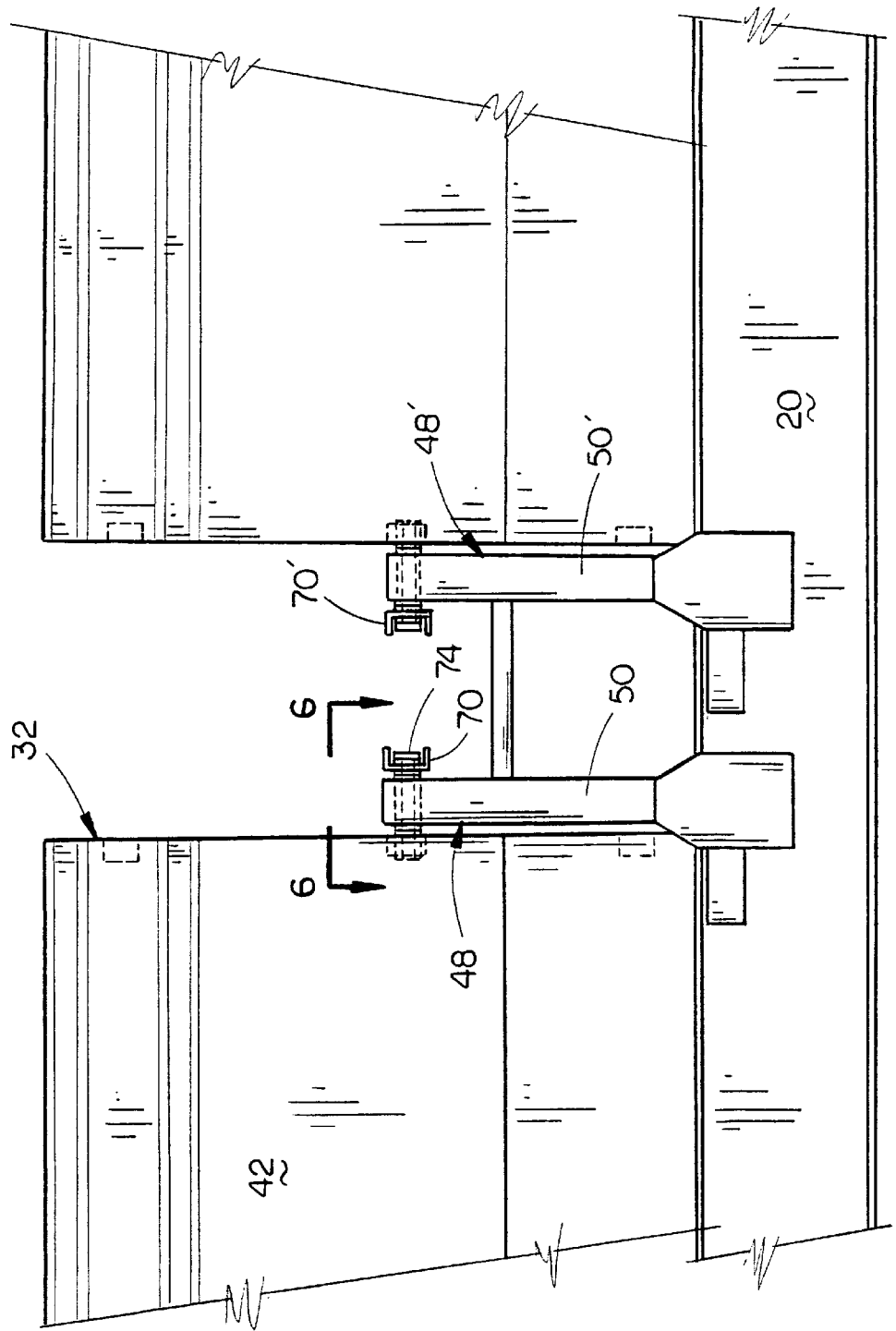
FIG. 5 is a partial side elevational view of the side dump body of this invention.
Figure 6:
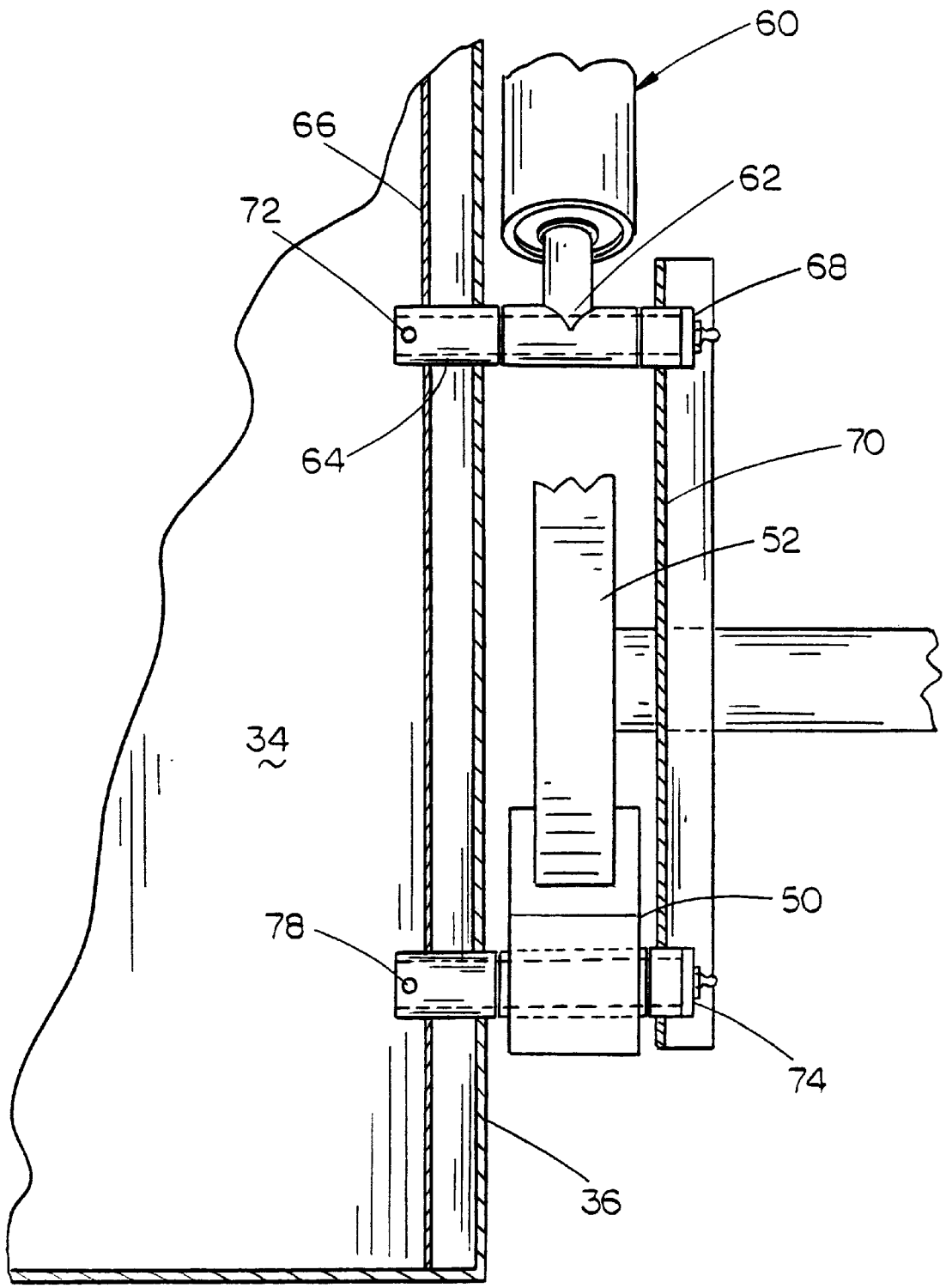
FIG. 6 is a sectional view as seen on lines 6—6 of FIG. 5.

A first support 48 is secured to the frame means 14 at the rearward end of body 32 while a second support 48' is secured to the frame means 14 at the forward end of the body 32. Inasmuch as second support 48' is identical to first support 48, only first support 48 will be described in detail with "'" indicating identical structure on second support 48'. As seen in FIG. 4, support 48 includes an upstanding post means 50 which is welded to frame member 20 and which extends outwardly and upwardly therefrom. Brace 52 is secured to and extends between post 50 and a pair of cross members 54 and 56 which are secured to and which extend between frame members 18 and 20. The base end 58 of a hydraulic cylinder 60 is pivotally connected to the cross members 54 and 56 and has its rod end 62 pivotally connected to tubular member 64 which is positioned in wall 36, as illustrated in FIG. 4. Tubular member 64 not only extends through wall 36, as illustrated in FIG. 4, but extends through a channel-shaped rib 66 which is welded to the interior surface of front wall 36 for strengthening purposes. Pin 68 extends through one end of a connecting arm 70, through the rod end 62 of cylinder 60 and through the tubular member 64. Cotter key 72 secures pin 68 in place. Pin 74 extends through the other end of connecting arm 70, through the collar 76 positioned in the upper end of post 50, through the wall 36, and through the rib 66. Pin 74 is secured in place by means of the cotter key 78.

The second support 48' is identical to the second support 48, as stated, except that it is associated with the front wall 38 rather than the back wall 36 of the body 32. As seen in FIG. 4, guides 80 and 82 extend upwardly from frame member 18 for receiving the body 32 therebetween when the body 32 is in its transport position.

FIG. 2 illustrates the body 32 in its transport position. In the transport position, the bottom wall 34 rests upon the frame members 18 and 20 between the guides 80 and 82. When it is desired to dump the contents of the body 32 therefrom, the hydraulic cylinder 60 is extended (as is the hydraulic cylinder associated with support 48') which causes the body 32 to be pivotally moved from the position illustrated by solid lines in FIG. 2 to the position illustrated by broken lines in FIG. 2. Further extension of the hydraulic cylinders causes the body to be pivotally moved to the position illustrated by broken lines in FIG. 3 so that the contents thereof will be dumped. The arrangement of the connecting arms 70 and 70', the posts 50 and 50', and the hydraulic cylinders, together with the relationship of the supports 48 and 48', permits the body 32 to be dumped so that the contents are dumped therefrom laterally of the side of the truck or trailer. Angled wall portion 44 enables the body 32 to clear the frame member 20 as it is being pivotally moved from its transport position to its dumping position.

Thus, the side dump body of this invention enables different materials, such as mulch, peat, rock, gravel, etc., to be contained within the various side dump body units.

Further, the concept of employing a multiple of side dump units creates stability to the invention, since the operator may dump only a single body unit while maintaining the other side dump body units in their non-dumping position. In other words, the side dump body invention will not tend to tip over as readily when only a single body is being dumped as opposed to if all of the side dump body units were dumped at the same time.

Further, the substantially vertically disposed side walls of the body increase the carrying capacity of the body as compared to the angled wall configuration of conventional side dump trailers.

Thus it can be seen that the invention accomplishes at least all of its stated objectives.

I claim:

1. In combination:
    a wheeled frame means having a rearward end, a forward end, and first and second sides;
    said frame means including first and second elongated, longitudinally extending frame members;
    a first upstanding support having upper and lower ends;
    said first support secured to said first frame member and extending upwardly therefrom;
    a second upstanding support having upper and lower ends;
    said second support secured to said first frame member and extending upwardly therefrom in a spaced-apart relationship with respect to said first support;
    a dump boy positioned between said first and second supports and being movable from a transport position to a dumping position;
    said dump body including a front wall, a back wall, a bottom wall, and first and second side walls;
    said upper end of said first support being pivotally secured to said back wall adjacent said first side wall;
    said upper end of said second support being pivotally secured to said front wall adjacent said first side wall;
    a first elongated hydraulic cylinder, having upper and lower ends, operatively pivotally secured at its lower end to said frame means and extending upwardly therefrom;
    said upper end of said first hydraulic cylinder being pivotally secured to said back wall laterally inwardly of the pivotal connection of said first support and said back wall;
    a second elongated hydraulic cylinder, having upper and lower ends, operatively pivotally secured at its lower end to said frame means and extending upwardly therefrom;
    said upper end of said second hydraulic cylinder being pivotally secured to said front wall laterally inwardly of the pivotal connection of said second support and said front wall;
    said first and second hydraulic cylinders normally being in a retracted condition, but being movable to an extended position whereby said dump body will pivotally move with respect to said first and second supports and will pivotally move laterally with respect to a longitudinal axis of said frame means from its transport position to its dumping position so that material in said body will be dumped therefrom laterally of said frame means.

2. The combination of claim 1 wherein said bottom wall of said body operatively engages said first and second frame members when said body is in its transport position.

3. The combination of claim 1 wherein said second wall is substantially vertically disposed when said body is in its transport position.

4. The combination of claim 1 wherein the upper ends of said first and second supports are pivotally secured to said back and front walls, respectively, by means of pivot pins extending through said back and front walls.

5. The combination of claim 1 wherein a plurality of said first and second supports are positioned on said frame means and wherein a respective said dump body is pivotally positioned between each of said first and second supports.

6. In combination:
    a wheeled frame means having a rearward, end, a forward end, and first and second sides;
    a first upstanding support having upper and lower ends;
    said first support secured to said frame means and extending upwardly therefrom;
    a second upstanding support having upper and lower ends;
    said second support secured to said frame means and extending upwardly therefrom in a spaced-apart relationship with respect to said first support;

a dump body positioned between said first and second supports and being movable from a transport position to a dumping position;

said dump body including a front wall, a back wall, a bottom wall, and first and second sides;

said upper end of said first support being pivotally secured to said back wall adjacent said first side wall;

said upper end of said second support being pivotally secured to said front wall adjacent said first side wall;

a first elongated hydraulic cylinder, having upper and lower ends, operatively pivotally secured at its lower end to said frame means and extending upwardly therefrom;

said upper end of said first hydraulic cylinder being pivotally secured to said back wall;

a second elongated hydraulic cylinder, having upper and lower ends, operatively pivotally secured at its lower end to said frame means and extending upwardly therefrom;

said upper end of said second hydraulic cylinder being pivotally secured to said front wall;

said first and second hydraulic cylinders normally being in a retracted condition, but being movable to an extended position whereby said body will pivotally move with respect to said first and second supports and will pivotally move laterally with respect to a longitudinal axis of said frame means from its transport position to its dumping position so that material in said body will be dumped therefrom laterally of said frame means.

7. The combination of claim 6 wherein said bottom wall of said body engages said frame means when said body is in its transport position.

8. The combination of claim 6 wherein said second wall is substantially vertically disposed when said body is in its transport position.

9. The combination of claim 6 wherein said first side wall includes a lower end portion which extends upwardly and outwardly from said bottom wall and an upper end portion which extends upwardly from an upper end of said lower end portion.

10. The combination of claim 9 wherein said upper end portion of said first side wall is substantially vertically disposed when said body is in its transport position.

11. The combination of claim 10 wherein said second wall is substantially vertically disposed when said body is in its transport position.

12. The combination of claim 6 wherein a first brace member, having upper and lower ends, is secured at its lower end to said frame means and extends upwardly and outwardly therefrom, said upper end of said first brace member being secured to said first support and wherein a second brace member, having upper and lower ends, is secured at its lower end to said frame means and extends upwardly and outwardly therefrom, said upper end of said second brace member being secured to said second support.

13. The combination of claim 6 wherein a first connecting arm extends between the pivotal connection of said first support with said back wall and the pivotal connection of said first hydraulic cylinder with said back wall and wherein a second connecting arm extends between the pivotal connection of said second support with said front wall and the pivotal connection of said second hydraulic cylinder with said front wall.

14. In combination:

a wheeled frame means having a rearward end, a forward end, and first and second sides;

said frame means including first and second elongated, longitudinally extending frame members;

a plurality of spaced-apart first upstanding supports having upper and lower ends;

said first supports being secured to said first frame member and extending upwardly therefrom;

a plurality of spaced-apart second upstanding supports having upper and lower ends;

said second supports being secured to said first frame member and extending upwardly therefrom in a spaced-apart relationship with respect to said first supports;

a dump body positioned between each of said first and second supports and being movable from a transport position to a dumping position;

each of said dump bodies including a front wall, a back wall, a bottom wall, and first and second side walls;

said upper end of each of said first supports being pivotally secured to said back wall of a respective one of said dump bodies adjacent said first side wall thereof;

said upper end of each of said second supports being pivotally secured to said front wall of a respective one of said dump bodies adjacent said first side wall thereof;

a plurality of first elongated hydraulic cylinders, having upper and lower ends, operatively pivotally secured at their lower ends to said frame means and extending upwardly therefrom in a spaced-apart relationship;

said upper end of each of said first hydraulic cylinders being pivotally secured to the back wall of a respective one of said dump bodies laterally inwardly of the pivotal connection of the associated first support and the associated back wall;

a plurality of second elongated hydraulic cylinders, having upper and lower ends, operatively pivotally secured at its lower end to said frame means and extending upwardly therefrom in a spaced-apart relationship;

said upper end of each of said second hydraulic cylinders being pivotally secured to the front wall of a respective one of said dump bodies laterally inwardly of the pivotal connection of the associated second support and the associated front wall;

said first and second hydraulic cylinders normally being in a retracted condition, but being movable to an extended position whereby the respective dump body will pivotally move with respect to the associated first and second supports and will pivotally move laterally with respect to a longitudinal axis of said frame means from its transport position to its dumping position so that material in the respective dump body will be dumped therefrom laterally of said frame means.

* * * * *